(12) United States Patent
Zhou et al.

(10) Patent No.: US 8,996,464 B2
(45) Date of Patent: Mar. 31, 2015

(54) EFFICIENT PARTITIONING TECHNIQUES FOR MASSIVELY DISTRIBUTED COMPUTATION

(75) Inventors: Jingren Zhou, Bellevue, WA (US); Nicolas Bruno, Bellevue, WA (US); Wei Lin, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

(21) Appl. No.: 13/494,006

(22) Filed: Jun. 11, 2012

(65) Prior Publication Data

US 2013/0332446 A1 Dec. 12, 2013

(51) Int. Cl.
*G06F 17/30* (2006.01)
*G06F 9/50* (2006.01)

(52) U.S. Cl.
CPC ........ *G06F 9/5066* (2013.01); *G06F 17/30584* (2013.01); *Y10S 707/968* (2013.01)
USPC ........... 707/638; 707/635; 707/637; 707/803; 707/809; 707/968

(58) Field of Classification Search
USPC ........................................................ 707/968
See application file for complete search history.

(56) References Cited

U.S. PATENT DOCUMENTS

| | | | |
|---|---|---|---|
| 2004/0199533 A1* | 10/2004 | Celis et al. .................... | 707/101 |
| 2006/0218123 A1* | 9/2006 | Chowdhuri et al. ............. | 707/2 |
| 2008/0162409 A1* | 7/2008 | Meijer et al. ...................... | 707/2 |
| 2008/0189239 A1* | 8/2008 | Bawa et al. ........................ | 707/2 |
| 2009/0144346 A1* | 6/2009 | Duffy et al. .................... | 707/205 |
| 2010/0030800 A1* | 2/2010 | Brodfuehrer et al. ......... | 707/102 |
| 2010/0036886 A1* | 2/2010 | Bouloy et al. ................ | 707/200 |
| 2010/0241827 A1 | 9/2010 | Yu et al. | |
| 2011/0066481 A1* | 3/2011 | Vazacopoulos et al. ... | 705/14.13 |
| 2011/0191361 A1 | 8/2011 | Gupta et al. | |

(Continued)

OTHER PUBLICATIONS

Becerra, et al., "Speeding Up Distributed MapReduce Applications Using Hardware Accelerators", Retrieved at <<http://upcommons.upc.edu/e-prints/bitstream/2117/9999/1/Becerra.pdf>>, ICPP '09. International Conference on Parallel Processing, Sep. 22, 2009, p. 42-49.

(Continued)

*Primary Examiner* — Mohammad S Rostami
(74) *Attorney, Agent, or Firm* — Ben Tabor; Kate Drakos; Micky Minhas

(57) ABSTRACT

A repartitioning optimizer identifies alternative repartitioning strategies and selects optimal ones, accounting for network transfer utilization and partition sizes in addition to traditional metrics. If prior partitioning was hash-based, the repartitioning optimizer can determine whether a hash-based repartitioning can result in not every computing device providing data to every other computing device. If prior partitioning was range-based, the repartitioning optimizer can determine whether a range-based repartitioning can generate similarly sized output partitions while aligning input and output partition boundaries, increasing the number of computing devices that do not provide data to every other computing device. Individual computing devices, as they are performing a repartitioning, assign a repartitioning index to each individual data element, which represents the computing device to which such a data element is destined. The indexed data is sorted by such repartitioning indices, thereby grouping together all like data, and then stored in a sequential manner.

20 Claims, 6 Drawing Sheets

(56) References Cited

U.S. PATENT DOCUMENTS

| | | | |
|---|---|---|---|
| 2012/0109888 A1* | 5/2012 | Zhang et al. | 707/610 |
| 2012/0310916 A1* | 12/2012 | Abadi et al. | 707/713 |
| 2013/0311441 A1* | 11/2013 | Erdogan et al. | 707/713 |

OTHER PUBLICATIONS

Valvag, Steffen Viken, "Cogset: A High-Performance MapReduce Engine", Retrieved at <<http://munin.uit.no/bitstream/handle/10037/3817/thesis.pdf?sequence=2>>, Sep. 2011, p. 1-126.

Pawlikowski, et al., "Efficient Processing of Data Warehousing Queries in a Split Execution Environment", Retrieved at <<http://cs-www.cs.yale.edu/homes/dna/papers/split-execution-hadoopdb.pdf>>, SIGMOD '11 Proceedings of the 2011 international conference on Management of data, Jun. 12, 2011, p. 1165-1176.

Chou, et al., "Parallel Index and Query for Large Scale Data Analysis", Retrieved at <<http://cseweb.ucsd.edu/~jchou/publication/FQ_SC11.pdf>>, SC '11 Proceedings of 2011 International Conference for High Performance Computing, Networking, Storage and Analysis, Nov. 12, 2011, p. 1-11.

Lee, Gunho, "Embracing Heterogeneity in Scheduling MapReduce", Retrieved at <<http://www.cs.berkeley.edu/~agearh/cs267.sp10/files/cs267_gunho.pdf>>, Retrieved Date : Sep. 16, 2011, p. 1-9.

"Hadoop", Retrieved at <<http://hadoop.apache.org/>>, Feb. 22, 2012, pp. 3.

Chaiken, et al., "SCOPE: Easy and Efficient Parallel Processing of Massive Data Sets", Retrieved at <<http://www.dbis.informatik.hu-berlin.de/fileadmin/lectures/WS2010_11/Neue_Entwicklungen/ScopeMSR.pdf>>, In Proceedings of VLDB Conference, 2008, p. 1265-1276.

Dean, et al., "MapReduce: Simplified Data Processing on Large Clusters", Retrieved at <<http://homepages.dcc.ufmg.br/~mirella/DCCbda/slides/artigo-mapreduce-osdi04.pdf>>, In Proceedings of OSDI Conference, 2004, p. 1-13.

DeWitt, et al., "Parallel Database Systems: The Future of High Performance Database Processing", Retrieved at <<http://pages.cs.wisc.edu/~anhai/courses/764-sp07-anhai/paralleldb.pdf>>, The Future of High Performance Database Processing. Communications of the ACM, 36(6), 1992, p. 1-26.

Ghemawat, et al., "The Google File System", Retrieved at <<http://www.cs.brown.edu/courses/cs295-11/2006/gfs.pdf>>, In Proceedings of SOSP Conference, 2003, pp. 15.

Graefe, G., "Encapsulation of Parallelism in the Volcano Query Processing System", Retrieved at <<http://www.cs.colorado.edu/department/publications/reports/docs/CU-CS-458-90.pdf>>, In Proceeding of SIGMOD Conference, 1990, pp. 14.

Graefe, G., "The Cascades Framework for Query Optimization", Retrieved at <<http://citeseerx.ist.psu.edu/viewdoc/download;jsessionid=DF5638A1A4EEDCBCFB00B5C5D6DA5E9A?doi=10.1.1.98.9460&rep=rep1&type=pdf>>, Data Engineering Bulletin, 18(3), 1995, p. 19-28.

Graefe, et al., "The Volcano Optimizer Generator: Extensibility and Efficient Search", Retrieved at <<http://ieeexplore.ieee.org/stamp/stamp.jsp?tp=&arnumber=344061>>, In Proceeding of ICDE Conference, 1993, p. 209-218.

Isard, et al., "Dryad: Distributed Data-Parallel Programs from Sequential Building Blocks", Retrieved at <<http://www.cse.buffalo.edu/~stevko/courses/cse704/fall10/papers/eurosys07.pdf>>, In Proceedings of EuroSys Conference, 2007, pp. 14.

Neumann, et al., "A Combined Framework for Grouping and Order Optimization", Retrieved at <<http://www.vldb.org/conf/2004/RS24P3.PDF>>, In Proceedings of VLDB Conference, 2004, p. 960-971.

Neumann, et al., "An Efficient Framework for Order Optimization", Retrieved at <<http://citeseerx.ist.psu.edu/viewdoc/download?doi=10.1.1.10.2557&rep=rep1&type=pdf>>, In Proceedings of ICDE Conference, 2004, pp. 12.

Olston, et al., "Pig Latin: A Not-So-Foreign Language for Data Processing", Retrieved at <<http://i.stanford.edu/~olston/publications/sigmod08.pdf>>, In Proceedings of SIGMOD Conference, 2008, pp. 12.

Selinger, et al., "Access Path Selection in a Relational Database Management System", Retrieved at <<http://www.se.cuhk.edu.hk/~yu/papers/background-systemr-sigmod79.pdf>>, In Proceedings of SIGMOD Conference, 1979, pp. 12.

Thusoo, et al., "Hive—A Warehousing Solution over a MapReduce Framework", Retrieved at <<http://www.ipvs.uni-stuttgart.de/abteilungen/as/lehre/lehrveranstaltungen/hauptseminare/WS1011/HSEM_termine/dateien/Hive_VLDB09.pdf>>, In Proceedings of VLDB Conference, 2009, p. 1626-1629.

Thusoo, et al., "Hive—A Petabyte Scale Data Warehouse Using Hadoop", Retrieved at <<http://people.cs.kuleuven.be/~bettina.berendt/teaching/2010-11-2ndsemester/ctdb/petabyte_facebook.pdf>>, In Proceedings of ICDE Conference, 2010, p. 996-1005.

Wang, et al., "Avoiding Sorting and Grouping in Processing Queries", Retrieved at <<http://pages.cs.brandeis.edu/~wangxy/pdfs/wang-vldb03.pdf>>, In Proceedings of VLDB Conference, 2003, pp. 12.

Yu et al., "DryadLINQ: A System for General-Purpose Distributed Data-Parallel Computing Using a High-Level Language", Retrieved at <<http://www.news.cs.nyu.edu/~jinyang/fa09/papers/yu-dryadlinq.pdf>>, In Proceedings of OSDI Conference, 2008, p. 1-14.

Zhou, et al., "Incorporating Partitioning and Parallel Plans into the SCOPE Optimizer", Retrieved at <<http://ieeexplore.ieee.org/stamp/stamp.jsp?tp=&arnumber=5447802>>, In Proceedings of ICDE Conference, 2010, p. 1060-1071.

Simmen, et al., "Fundamental Techniques for Order Optimization", SIGMOD '96, Jun. 1996, p. 57-67.

\* cited by examiner

EFFICIENT PARTITIONING TECHNIQUES FOR MASSIVELY DISTRIBUTED COMPUTATION

BACKGROUND

Certain tasks performed by computing devices can be divided into sub-tasks that can be performed independently of one another. In such cases, each of the sub-tasks can be performed in parallel, such that the independent processing of each sub-task completes at approximately the same time and reduces the overall time required to perform the task by orders of magnitude. More specifically, the overall time required to perform a task that can be divided into sub-tasks that can be performed in parallel can be directly related to the number of sub-tasks into which such a task can be divided. In some instances tasks can be divided into tens, or even hundreds, of thousands of sub-tasks. In those instances, the overall tasks can be completed tens or hundreds of thousands of times faster by performing each of the sub-tasks in parallel assuming, of course, that tens or hundreds of thousands of independent computing devices are available to compute each of the sub-tasks. The division of a task into such a large number of sub-tasks is typically referred to as massively distributed computation.

When performing massively distributed computation, the processing performed by each individual computing device is, typically, based upon a defined subset of the overall data on which the overall task is being performed. For efficiency purposes, such a subset of data resides in the local memory or storage of the individual computing device that is performing processing based on that subset. In situations where a single collection of data is being processed by multiple tasks, each of which can be divided into a large quantity of sub-tasks, it often becomes necessary to redistribute data among the computing devices that are individually processing the sub-tasks. For example, the determination of the average age of each make and model of automobile currently registered in a given area can be divided into independent sub-tasks where one computing device determines the average age of one make and model, while another computing device determines the average age of another make and model. Since the average age of one make and model of automobile is based only on the ages of the automobiles of that make and model, and is independent of the ages of any other automotive make and model, each of those exemplary sub-tasks can be performed independently of one another. To perform one such sub-task, however, a computing device can have, locally available in its own memory or storage, the registration information of each automobile that is of a specific make and model.

Should a subsequent task seek to, for example, determine the average number of miles listed on the odometers of automobiles built in specific years, it can become necessary to redistribute the data among the computing devices performing the processing. More specifically, the exemplary subsequent task can be divided into independent sub-tasks that can each, individually, determine the average number of miles listed on the odometers of automobiles built in one specific year. In order to perform such sub-tasks, however, each individual computing device can require local access, not to all of the registration information for a specific make and model, which is currently what each computing device can possess, but rather to all of the registration information for a specific manufacturing year, irrespective of the make and model of the automobile. In such an example, the data can be redistributed, or "re-partitioned", among the computing devices, with each computing device sending to other computing devices the data it no longer needs and obtaining from such other computing devices the data that it now does need.

Such a repartitioning of data can introduce meaningful delays. In particular, the communication of large amounts of data over network communications can, even with the fastest network communications, take a substantial amount of time as compared to the amount of time spent processing such data. In addition, the partitioning of data locally, by each individual computing device, in order to determine which data is currently stored on that computing device that should be sent to a different computing device, can also introduce delays. In particular, such local partitioning of data can result in a substantial amount of randomized input/output operations, which are not efficiently performed by traditional magnetic storage media.

SUMMARY

In one embodiment, a repartitioning optimizer can identify multiple, alternative repartitioning strategies and can select an optimal repartitioning strategy based not only on processing and local input/output utilization, but also based on network transfer utilization, and based on resulting partition sizes.

In another embodiment, if a prior partitioning was hash-based but did not satisfy a current partitioning requirement, the repartitioning optimizer can determine whether a hash-based repartitioning can be performed such that not every computing device needs to provide data to every other computing device, thereby rendering the transfer of data between computing devices, over a network, more efficient.

In a further embodiment, if a prior partitioning was range-based but did not satisfy a current partitioning requirement, the repartitioning optimizer can determine whether a range-based repartitioning can be performed such that the resulting partitions are similarly sized, such that the data is evenly distributed among the resulting partitions, and such that input and output partition boundaries are aligned as much as possible to increase the number of computing devices that do not need to provide data to every other computing device.

In a still further embodiment, as each individual computing device is performing a repartitioning, rather than dividing its existing data into individual files that are destined for other computing devices as part of the repartitioning, the computing device can assign a repartitioning index to each individual data element, representing the computing device to which such a data element is destined. Subsequently the computing device can sort its existing data by such repartitioning indices, thereby grouping together all of the data destined for a particular computing device, and can then write such data to its storage medium in a sequential manner, thereby avoiding randomized input/output operations, and resulting in a greater input/output efficiency.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
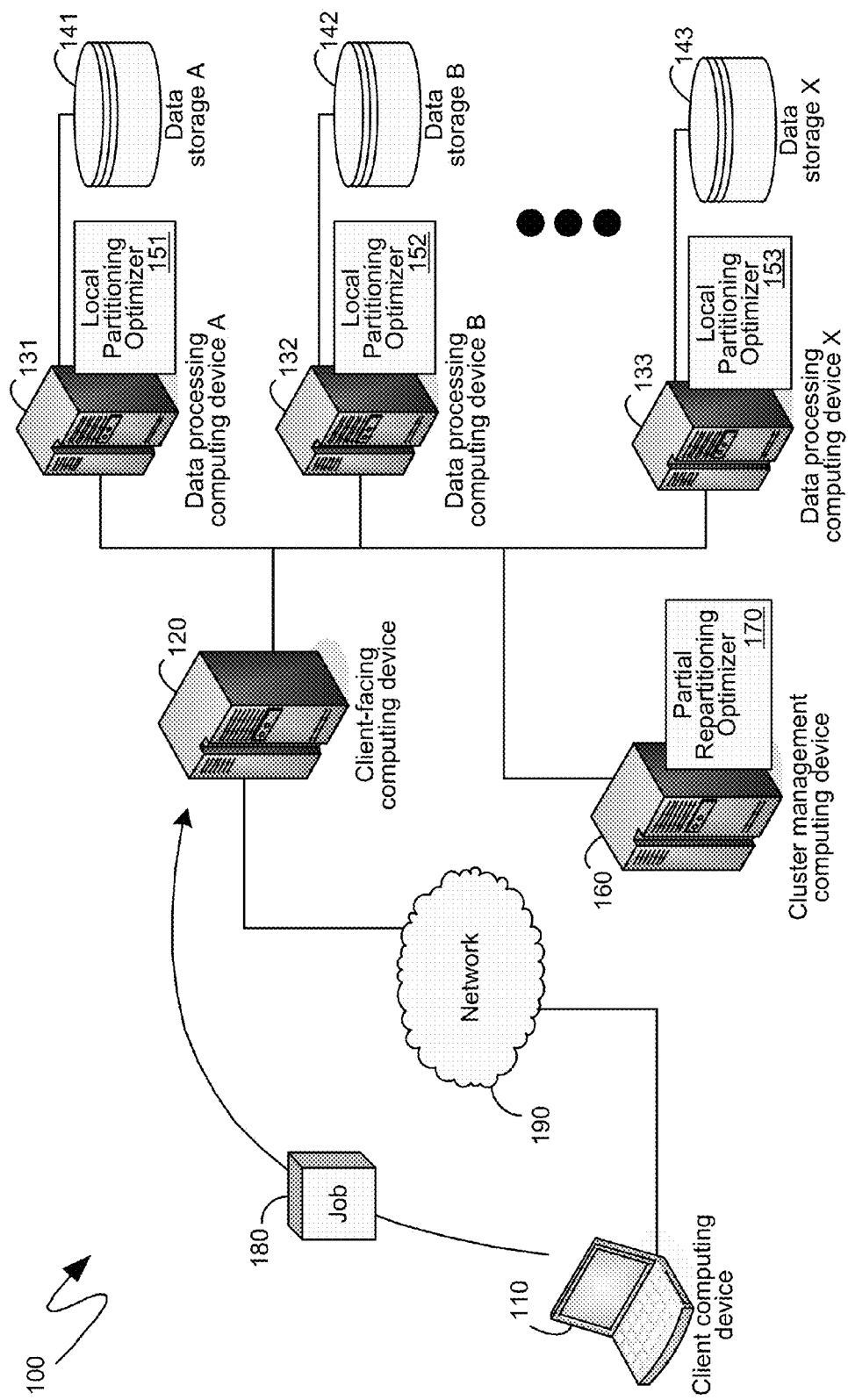
FIG. 1 is a block diagram illustrating an exemplary system for implementing scalable scheduling.

The following description relates to mechanisms for improving the efficiency of repartitioning operations, such as in the context of massively distributed computation. A repartitioning optimizer can identify multiple, alternative repartitioning strategies and can select an optimal repartitioning strategy based not only on processing and local input/output utilization, but also based on network transfer utilization, and based on resulting partition sizes. In particular, if a prior partitioning was hash-based but did not satisfy the current partitioning requirement, the repartitioning optimizer can determine whether a hash-based repartitioning can be performed such that not every computing device needs to provide data to every other computing device, thereby rendering the transfer of data between computing devices, over a network, more efficient. Alternatively, if a prior partitioning was range-based but, again, did not satisfy the partitioning requirement, the repartitioning optimizer can determine whether a range-based repartitioning can be performed such that the resulting partitions are similarly sized, such that the data is evenly distributed among the resulting partitions, and such that input and output partition boundaries are aligned as much as possible to increase the number of computing devices that do not need to provide data to every other computing device. Additional repartitioning optimizations can be realized at individual computing devices which, as they are performing a repartitioning, rather than dividing their existing data into individual files that are destined for other computing devices, can, instead, assign a repartitioning index to each individual data element, representing the computing device to which such a data element is destined. Subsequently each computing device can sort its existing data by such repartitioning indices, thereby grouping together all of the data destined for a particular computing device, and can then write such data to its storage medium in a sequential manner, thereby avoiding randomized input/output operations, and resulting in a greater input/output efficiency, especially within the context of magnetic storage media.

Although not required, the description below will be in the general context of computer-executable instructions, such as program modules, being executed by one or more computing devices. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary system 100 is illustrated, providing context for the descriptions below. Exemplary system 100 can comprise data processing computing devices 131, 132 and 133, which represent a large collection of computing devices, as indicated by the ellipses in FIG. 1, that can provide massively parallel data processing capabilities. Although illustrated as physically distinct computing devices, each of the data processing computing devices 131, 132 and 133 equally represent individual processing units in a single physical enclosure, such as a multi-processor computing device that can comprise hundreds, or even thousands, of processing units that operate independently of one another. Thus, the data processing computing devices 131, 132 and 133 are not meant to represent only standalone computing devices but are, instead, intended as a general representation of a device comprising processing capability, including, for example, one or more slots in a rack of server computing devices, or other like computing devices that are not necessarily "standalone".

Typically, data processing computing devices, such as the data processing computing devices 131, 132 and 133, have access to computer-readable media comprising the capability to store data in a computer-readable format, such as the data storage devices 141, 142 and 143, respectively. Access to such data storage devices can be through local communication media, which can be utilized when the data storage device is physically co-located with the data processing computing device, or through network communication media, which can be utilized when the data storage device is physically remote from the data processing computing device. For purposes of the descriptions below, the term "computing device" will refer to an individual, independent processing device, such as the data processing computing devices 131, 132 and 133, together with co-located storage, such as the storage devices 141, 142 and 143, respectively. The storage devices 141, 142 and 143 are illustrated as being external to the computing devices 131, 132 and 133, respectively, merely for ease of illustration and are meant to represent either internal or external storage devices.

In addition to data processing computing devices, such as the data processing computing devices 131, 132 and 133, the system 100 of FIG. 1 can also comprise a client-facing computing device 120 through which a user utilizing, for example, a client computing device 110, can provide a job 180 to be executed by the data processing computing devices 131, 132 and 133. The job 180 can represent any task, or set of tasks, that a user seeks to have performed by one or more of the data processing computing devices of the system 100. Typically, the job 180 is a data processing task that is directed to a set of data that is currently stored in individual data segments on one or more of the storage devices 141, 142 and 143. Such data is said to be "partitioned" into the partitions stored on the storage devices 141, 142 and 143. For purposes of performing the job 180, it may be necessary to reparation the data such that one or more of the computing devices 131, 132 and 133 take at least some of the data stored on their respective storage devices, namely the storage devices 141, 142 and 143, and provide it to another, different one of the computing devices. In particular, the individual portions of the job 180 that are assigned to the computing devices 131, 132 and 133 may require that each of those computing devices has access to a specific set of data, on their respective storage devices 141, 142 and 143, that differs from the data currently stored on such storage devices. Thus, in order to perform the job 180, the computing devices 131, 132 and 133 can exchange at least some of the data stored on their storage devices, namely the storage devices 141, 142 and 143, thereby repartitioning the data into a different set of partitions.

In one embodiment, one or more of the data processing computing devices, such as the data processing computing devices 131, 132 and 133, can execute local partitioning optimizers, such as the local partitioning optimizers 151, 152 and 153, respectively. As will be described in further detail below, the local partitioning optimizer can increase the efficiency with which the partitioning of data on each individual computing device is performed. Traditionally, to perform a repartitioning, the data from the data storage device 141 could be read by the computing device 131 and then, incrementally proceeding through such data, the computing device 131 could store each individual data unit into one of multiple separate files representing the destination of such data once the repartitioning would be completed. Such activity can result in a substantial amount of random input/output operations being performed on the data storage device 141. Thus, in one embodiment, the local partitioning optimizer 151 can, after the data from the data storage device 141 has been read by the computing device 131, assign to each individual data unit, a partition index identifier representing the destination of such a data unit after the repartitioning is complete. The local partitioning optimizer 151 can then sort the data based on the partition index, thereby collecting together all of the individual data units that are to be sent to a specific destination computing device as part of the repartitioning. The sorted data can then be stored sequentially on the data storage device 141, thereby avoiding the less efficient random input/output operations, and thereby increasing efficiency. Similar functionality can be performed by the other local partitioning optimizers, such as the local partitioning optimizer 152 executing on the computing device 132, and the local partitioning optimizer 153, executing on the computing device 133.

Each of the local partitioning optimizers 151, 152 and 153 can improve the efficiency of a repartition operation from the standpoint of the actions performed at each individual computing device. Other optimizations can be applied to the overall repartitioning process. Thus, in one embodiment, a partial repartitioning optimizer 170 can be part of the system 100 such as, for example, by executing on a management computing device 160 or another computing device that is part of the system 100. The partial repartitioning optimizer 170 can take into account the manner in which data is currently partitioned and can select a repartitioning strategy that can minimize not only the amount of processing and input/output operations involved in performing such a repartitioning, but the partial repartitioning optimizer can also seek to minimize the amount of data exchanged between computing devices via network communications. In particular, if the existing partitioning of data is hash-based but does not satisfy the current partitioning requirement, the partial repartitioning optimizer 170 can determine whether a hash-based repartitioning can be performed such that not every computing device needs to provide data to every other computing device, thereby rendering the transfer of data between computing devices, over a network, more efficient. Alternatively, if the existing partitioning of data is range-based but does not satisfy the current partitioning requirement, the partial repartitioning optimizer 170 can determine whether a range-based repartitioning can be performed such that the resulting partitions are similarly sized, such that the data is evenly distributed among the resulting partitions, and such that input and output partition boundaries are aligned as much as possible to increase the number of computing devices that do not need to provide data to every other computing device. The amount of efficiency gained, in avoiding the transfer of data between computing devices over network, can be taken into account by the partial repartitioning optimizer 170 in selecting an optimal repartitioning strategy. Other considerations, such as the aforementioned processing and input/output costs, can also be taken into account. Consequently, a repartitioning strategy that minimizes the transfer of data between computing devices over a network may not necessarily be an optimal repartitioning strategy selected by the partial repartitioning optimizer 170 if such a repartitioning strategy requires too much processing or results in too many input/output operations.

Figure 2:
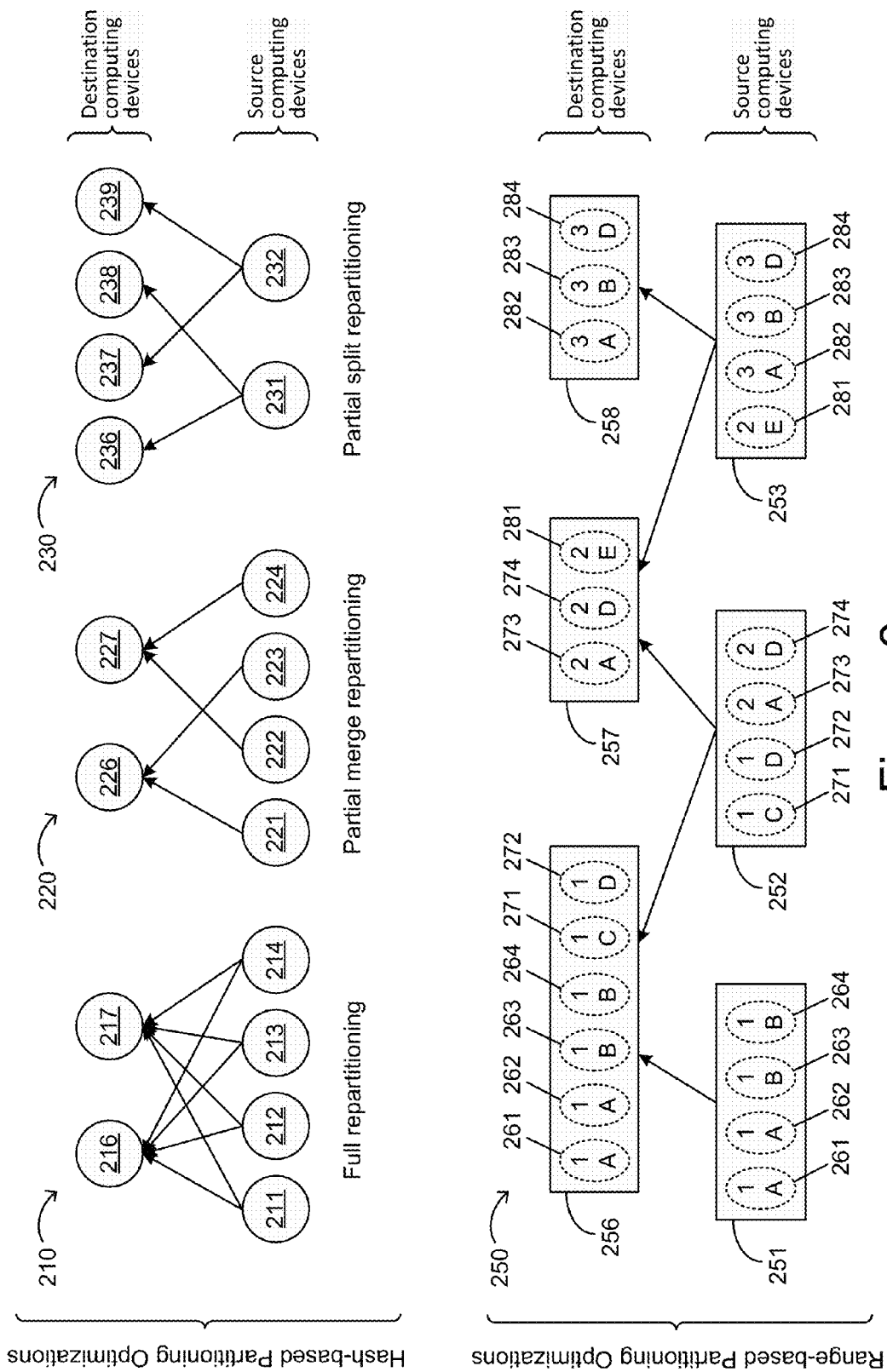
FIG. 2 is a block diagram illustrating exemplary partial repartitionings.

Turning to FIG. 2, the operation of the partial repartitioning optimizer 170 is described in greater detail with reference to the systems shown in FIG. 2. In order to provide a baseline for the descriptions below, the system 210 shown in FIG. 2 illustrates a full repartitioning. The circles 211, 212, 213 and 214 can represent a collection of four computing devices that each have a portion of a data set which can have been partitioned into four segments and assigned to them in order to perform a computation. The circles 216 and 217 can represent a collection of two computing devices, not necessarily different from the computing devices 211, 212, 213 and 214, that have been tasked to perform a subsequent computation and, as a result, the set of data can be partitioned again, now into two portions, which can each be assigned to one of the two computing devices 216 and 217.

One way of dividing a set of data into four groups can be to hash some or all of each entry in the data set and then divide the resulting hash value by the number four. The remainder of such a division operation will be one of the numbers zero, one, two or three and such remainder can then be utilized to assign each individual data entry to one of four groups: namely the group of data entries whose hashes, when divided by four, yielded a remainder of zero, the group of data entries whose hashes, when divided by four, yielded a remainder of one, and so on. In such a manner the data set can be divided into four partitions. Those four partitions can then be assigned to four computing devices such as, for example, the computing devices 211, 212, 213 and 214. Each one of the four computing devices 211, 212, 213 and 214 can then perform computations, in parallel, and independently from one another, on the partition of the data that was assigned to them.

Continuing the present example, a subsequent job can be assigned to only two computing devices and, consequently, the data set can be divided into two partitions such that each of the two computing devices can independently perform processing on the partition assigned to it. To perform such a re-partitioning, the data can be collected from the computing devices 211, 212, 213 and 214 to which it was previously partitioned and can be instead partitioned into two partitions, one of which can be provided to each of the two computing devices that have assigned to process this subsequent job. If the two computing devices assigned to perform such a job are the computing devices 216 and 217, then the system 210 illustrates one exemplary repartitioning by which the data that was originally divided among the computing devices 211, 212, 213 and 214 can be divided among the computing devices 216 and 270. In particular, and as shown in the system 210, each of the computing devices 211, 212, 213 and 214 can divide their partition of the data into two and then send one divided portion to the computing device 216 and the other divided portion to the computing device 217. As before, such a division can be hash-based by, for example, hashing some or all of a data entry and then dividing such a hash value by the number two. Data entries whose hash value does not evenly divide by the number two can be sent to one of the computing devices 216 or 217, and data entries whose hash value does divide evenly by the number two can be sent to the other computing device.

In some instances, such as is illustrated by the system 210, a repartitioning can result in a "full repartitioning" where each of the computing devices currently having some portion of the data set communicates data to each of the computing devices among which the data will be subsequently divided. For example, each one of the source computing devices 211, 212, 213 and 214, individually, communicates data to each one of the destination computing devices 216 and 217. Because each source computing device is communicating with each destination computing device, a full repartitioning can be inefficient.

Thus, in one embodiment, a partial merge repartitioning such as that shown in the system 220 of FIG. 2 can be performed. As can be seen from the system 220 each source computing device communicates data to only one destination computing device. Returning to the prior example, the set of data was distributed among the four computing devices 221, 222, 223 and 224 based on the remainders resulting after hashes of individual data entries were divided by the number four. To repartition the data to the two computing devices 216 and 217 another hash can be applied to each of the data entries, as also described above. However, if the same hash function is used to hash the same portion of each data entry then certain efficiencies can arise due to the mathematics inherent in such operations. In particular, if the hash of a data entry was such that its division by, for example, the number four, yielded a remainder of zero, then that same hash of that same data entry will result in a value that, when divided by, for example, the number two will also yield a remainder of zero. Thus, if the partition of data that was provided to the computing device 221 was the collection of data entries whose hash values, when divided by four, yielded a remainder of zero, then, when rehashing those same data entries, and dividing them by the number two, every data entry will result in a hash whose value is evenly divided by the number two, leaving a remainder of zero. Thus, for purposes of dividing the data assigned to the source computing device 221 among the two destination computing devices 226 and 227, utilizing a hash-based partitioning strategy, such as in the specific example provided above, the source computing device 221 would not end up sending any portion of its set of data to, for example, the destination computing device 227 and would, therefore, only need to communicate with the destination computing device 226. Likewise for the source computing device 223, as will be recognized by those skilled in the art. Conversely, as will also be recognized by those skilled in the art, source computing devices 222 and 224 can have data partitions whose data entries, when hashed and then divided by two, will always have a remainder of one, and, as a consequence, the source computing devices 222 and 224 need only communicate their data partitions to the destination computing device 227, and need not communicate with the destination computing device 226.

A similar mathematical relationship exists if the repartitioning results in a greater number of partitions that the current partitioning. For example, the system 230 illustrates an exemplary system in which a data set can have been previously partitioned between two computing devices, namely the computing devices 231 and 232, and can then be subsequently partitioned among four computing devices, namely the computing devices 236, 237, 238 and 239. One mechanism for partitioning the data set, as indicated previously, is a hash-based mechanism. Thus, to partition the data set between the two computing devices 231 and 232, some or all of each data entry can be hashed, and the resulting hash value can be divided by the number two. The remainder of such an operation will either be the number zero or the number one. Data entries whose hash values result, after the division, in a remainder of zero can be assigned to, for example, the computing device 231, while data entries whose hash values result in a remainder of one can be assigned to the computing device 232. Subsequently, to partition the data set into four partitions, namely the partitions that will be assigned to the computing devices 236, 237, 238 and 239, a hash-based partitioning strategy can again be utilized by, for example, hashing some or all of each data entry and then dividing the resulting hash value by the number four. Data entries whose hash values, when divided by the number four, yield the remainder of zero can, for example, be assigned to the computing device 236, data entries whose hash values yield a remainder one can, for example, be assigned to the computing device 237, and so on.

As before, mathematical relationships can provide inherent limitations on which type of data entries each of the computing devices 231 and 232 comprise. In particular, so long as the same hash function is utilized to hash the same portion of each data entry, data entries whose hash values resulted in a remainder of zero when divided by the number two, and, were thus assigned to the computing device 231, will, mathematically also have hash values that result in either remainder of zero or remainder of two when divided by the number four. As will be recognized by those skilled in the art, data entries whose hash values resulted in the remainder of zero when divided by the number two cannot, mathematically, have hash values that result in the remainder of one or three when divided by the number four, again assuming that the same hash function is utilized to hash the same portion of the data entries. Thus, as illustrated in the system 230, the source computing device 231 can have assigned to it a partition of data whose data entries, when hashed and then the resulting hash value divided by the number four, will only yield remainders of zero or remainders of two, and, as such, the source computing device 231 can send the data that was assigned to it to one of the destination computing devices 236 or 238, but not the destination computing devices 237 and 239. Likewise, for the same mathematically-based reasons, which will be obvious to those skilled in the art, resource computing device 332 can send the data that was assigned to it to one of the destination computing devices 337 or 339 but not the destination computing devices 236 were 238. As a result, efficiencies can be gained because each source computing device does not need to communicate with each destination computing device.

Expressed mathematically, if a data set was initially partitioned into "Pin" partitions and is subsequently to be repartitioned into "Pout" partitions, then each of the source computing devices, namely source computing device one, source computing device two and so on until source computing device Pin, can each divide the collection of data elements that represents their partition into Pout number of groupings. The first grouping of data at each of the Pin source computing devices can be provided to destination computing device one, the second grouping of data at each of the Pin source computing devices can be provided to destination computing device two, and so on until the Pout-th grouping of data at each of the Pin source computing devices can be provided to destination computing device Pout.

As indicated by example above, and with reference to systems 210, 220 and 230 of FIG. 2, efficiencies can be gained if some of the source computing devices have groupings without any data entries in them and, as such, some of the source computing devices will not communicate data to some of the destination computing devices. In general, a destination computing device "i" will receive data from a source computing device "j" if the source computing device "j" has data entries which, when hashed, result in a value that, when divided by Pout results in a remainder of "i". Mathematically, a destination computing device "i" will receive data from a source computing device "j" if there exists an integer "k" such that "k" is defined as "j" modulo Pin and such that "k" is also defined as "i" modulo Pout. This implies that there are integers "k1" and "k2" such that $k = k_1 \times P_{out} + i$ and $k = k_2 \times P_{in} + j$. Expressed differently, $P_{out} \times k_1 + (-P_{in}) \times k_2 = (j-i)$. As will be recognized by those skilled in the art, this is a linear diophantine equation of the form "a" times "x" plus "b" times "y" equals "c", which has integer (x, y) solutions if and only if c is a multiple of the greatest common denominator of a and b. Thus, mathematically, a destination computing device "i" will receive data from a source computing device "j" if "j" minus "i" is a multiple of the greatest common denominator of Pout and negative Pin. If Pout and Pin are co-primes, then every destination computing device will receive data from every source computing device and there are no efficiencies to be gained. However, if Pout and Pin are not co-primes, then there exist at least some source computing devices that will not communicate data to at least some destination computing devices, resulting in efficiencies.

In one embodiment, an optimizer, such as the partial repartitioning optimizer 170 shown in FIG. 1 can seek to take advantage of such relationships to minimize the number of source computing devices and number of destination computing devices communicating with one another as part of a repartitioning. More specifically, when a prior partitioning was hash-based, and a subsequent repartitioning can be hashed-based, the partial repartitioning optimizer 170 can attempt to select a hash-based partitioning strategy for the subsequent repartitioning where the number of partitions of the subsequent repartitioning is not co-prime with the number of partitions of the prior partitioning.

Similar efficiencies can be realized if the data partitioning was performed, not according to hash-based partitioning strategies, but rather according to range-based partitioning strategies. The system 250 shown in FIG. 2 illustrates one such range based partitioning strategy. In particular, and for purposes of providing a concrete example on which to base the descriptions below, a current partitioning of a data set can have been among three computing devices, namely the computing devices 251, 252 and 253. The data set can have been partitioned among the computing devices 251, 252 and 253 based on determined ranges of data such that each computing device was assigned a partition that comprised data entries whose relevant data elements were greater than a determined lower bound for that partition and were less than the determined upper bound for that partition, the range of the partition being defined by the lower bound the upper bound.

Thus, in the example shown in the system 200 of FIG. 2, the computing device 251 can have a partition of data that comprises four individual data entries, namely the data entries 261, 262, 263 and 264, which can have been partitioned to the computing device 251 based on the values of two different elements of the data entries, represented in the system 250 as a combination of a number and a letter. More specifically, the computing device 251 can comprise a partition of data whose range is defined by a lower bound that is less than, or equal to, the combination of two different elements whose values are represented by the number "1" and the letter "A", respectively, and whose upper bound is greater than, or equal to, the combination of two different elements whose values are represented by the number "1" and the letter "B", respectively. Likewise, the computing device 252 can have a partition of data that comprises four individual data entries, namely the data entries 271, 272, 273 and 274, which can have been partitioned based on a range that is defined by a lower bound that is less than, or equal to, the combination of two different elements whose values are represented by the number "1" and the letter "C", respectively, and that is defined by an upper bound that is greater than, or equal to, the combination of two different elements whose values are represented by the number "2" and the letter "D", respectively. Similarly, the computing device 253 can also have a partition of data that comprises four individual data entries, namely the data entries 281, 282, 283 and 284, which can have been partitioned based on a range that is defined by a lower bound that is less than, or equal to, the combination of two different elements whose values are represented by the number "2" and the letter "E", and that is defined by and upper bound that is greater than, or equal to, the combination of two different elements whose values are represented by the number "3" and the letter "D", respectively.

As can be seen from this illustrated example, computing device 251 includes some, but not all of the data entries whose first element is represented by the number "1" since, as indicated previously, partitioning can have been based on the combination of two different elements, and the second element, namely the one represented by a letter, can have caused some of the data entries, namely data entries 271 and 272, to have been partitioned to the computing device 252 even though their first element is equivalent to the first element of the data entries 261, 262, 263 and 264 that were partitioned to the computing device 251.

For purposes of continuing the illustrative example, a subsequent repartitioning of the data can be based on ranges that are defined by the values of only one element, such as, for example, the element represented by the number in the example illustrated in FIG. 2, as opposed to a combination of elements, such is the combination of the elements represented by the number and the letter in the illustrated example. As such, the data entries 261, 262, 263, 264, 271, 272, 273, 274, 281, 282, 283 and 284 can be partitioned into three partitions, the first of which can be defined by a range that includes all of the data entries whose first element is represented by the number "1", the second of which can be defined by a range that includes all of the data entries whose first element is represented by the number "2", and the third of which can be defined by a range that includes all of the data entries whose first element is represented by the number "3". Such partitions can then be assigned to the computing device is 256, 257 and 258, respectively.

As can be seen from the present example, which is illustrated by the system 250 of FIG. 2, not every one of the source computing devices 251, 252 and 253 needs to communicate with every one of the destination computing devices 256, 257 and 258. For example, the source computing device 251 need only communicate with the destination computing device 256 because, due to the relationship between the range that defined the partition assigned to the source computing device 251 and the range that defines the partition assigned to the destination computing device 256, the data entries of the partition assigned to the source computing device 251 are wholly contained by the range of the partition that is assigned to the destination computing device 256. Consequently, each of the data entries 261, 262, 263 and 264 that were part of the partition that was assigned to the source computing device 251 can also be part of the partition that is assigned to the destination computing device 256 and, as such, the source computing device 251 need only communicate data to the destination computing device 256, and need not communicate data to any other destination computing device, thereby providing an efficiency over a full repartitioning such as, for example, that illustrated by the system 210.

Analogously, because of the relationship between the range that defined the partitions assigned to the source computing devices 252 and 253 and the range that defines the partitions assigned to the destination computing devices 256, 257 and 258, the data entries of the partition assigned to the source computing device 252 fall into one of the two ranges that define the partitions assigned to the destination computing devices 256 and 257, and the data entries of the partition assigned to the source computing device 253 fall into one of the two ranges that define the partitions assigned to the destination computing devices 257 and 258. Consequently, some of the data entries were part of the partition that was assigned to the source computing device 252, such as, in the illustrated example, the data entries 271 and 272, can fall into the range that defines the partition that is assigned to the destination computing device 256, while the others of the data entries that were part of the partition that was assigned to the source computing device 252, such as, in the present example, the data entries 273 and 274, can fall into the range that defines the partition that is assigned the destination computing device 257. As such, the source computing device 252 need only communicate data to the destination computing devices 256 and 257, and need not communicate data to any other destination computing device. Similarly, some of the data entries were part of the partition that was assigned to the source computing device 253, such as, in the present example, the data entry 281, can fall into the range that defines the partition that is assigned to the destination computing device 257, while the others of the data entries that were part of the partition that was assigned to the source computing device 253, such as, in the present example, the data entries 282, 283 and 284, can fall into the range that defines the partition that is assigned the destination computing device 258. Thus, the source computing device 253 need only communicate data to the destination computing devices 257 and 258, and need not communicate data to any other destination computing device, thereby providing the above-referenced efficiencies.

More generally, such partial range-based repartitioning, where each source computing device provides data to only a subset of the destination computing devices, can be applied whenever the input and output partition schemes share a common data element that is utilized to define the ranges of the current partitions and the subsequent partitions, such as, for example, the data element represented by the numbers in the illustrated example of system 250, which was described in detail above. In one embodiment, a two-step analysis can be undertaken: first, the range boundaries for each new partition can be determined, and then subsequently, with such range boundaries, a determination can be made regarding which of the current partitions comprise data entries that are to be part of each new partition, thereby identifying which source computing devices will communicate the debt which destination computing devices.

In one embodiment, it can be desirable that the partitions resulting from a repartitioning embody an even distribution of the data entries. For example, in the exemplary system 250 that is shown in FIG. 2, the computing device 256 can comprise twice the number of data entries as the computing devices 257 and 258. Consequently, if each data entry takes an approximately equal amount of time to process, the overall processing of the data set can be limited by the ability of the computing device 256 to process its data entries since, in such an example, it is possible that the computing devices 257 and 258 will complete their processing of their data entries substantially prior to the computing device 256 completing its processing of its data entries, and will then have to wait for the computing device 256 to complete its processing before the current job can be completed. However, because the exemplary system 250 resulted in efficiencies due to the fact that the source computing devices 251, 252 and 253, individually, did not need to provide data to each of the destination computing devices 256, 257 and 258, such efficiencies can balance the potential inefficiencies of the uneven distribution of data entries among the partitions assigned to the destination computing devices 256, 257 and 258.

If the boundaries of range-based partitions can be aligned, such that current range-based partitions are defined by boundaries that share at least one data element with the boundaries utilized to define the new range-based partitions into which the data is being repartitioned, then the above-described efficiencies of avoiding communications between each source computing device and each destination computing device can be achieved while maintaining at approximately even distribution of the data entries among the new partitions into which the data set is being repartitioned. More specifically, the existing partitions can be conceptualized as a histogram, potentially a course histogram, of the data set over the data elements that were utilized to delineate the boundaries of the current, range-based partitions. Such a histogram can then aid in the selection of partition boundaries, for the partitions into which the data is being repartitioned, to avoid an uneven distribution of data among the partitions.

In one embodiment, if it is not possible to infer anything further about the distributions of individual data entries within a specific partition, then the upper and lower boundaries for the range-based partitions into which the data is being repartitioned can be selected by setting a lower boundary for a partition and then incorporating current partitions until the new partition reaches a target size in terms of the quantity of data entries that are expected to be within such a partition. Initially, the selection of a lower boundary for a range-based partition into which the data is being repartitioned can attempt to align with a lower boundary for a current partition, to the extent that the boundaries of current partitions share at least one common data element as the boundaries of the partitions into which the data is being repartitioned. Subsequently, the data entries that are part of a current partition having such a lower boundary can be counted, and if the quantity of data entries counted is still less than a target size for the partitions into which the data is being repartitioned, the data entries of a next higher current partition can be counted and the comparison with the target size can be performed again. Such a process can repeat until a partition is found whose data entries, if counted, would exceed the target size for the partitions into which the data is being repartitioned. The upper boundary of a partition into which the data is being repartitioned can then be sent to coincide with the upper boundary of the immediately prior current partition. The subsequent partition, into which the data will be repartitioned, can then have a lower boundary aligned with the upper boundary of the immediately prior subsequent partition, in processing in accordance with that described above can be performed again to determine an upper boundary of such a subsequent partition can be determined.

For example, if a data set comprises twelve data entries, and a current range-based partitioning can have resulted in four partitions that each comprise three data entries, and a repartitioning will result in two partitions, it can be determined, as will be obvious to those skilled in the art, that in order to maintain and even distribution of data entries among the two contemplated partitions, each partition should comprise approximately six data entries. Consequently, a lower boundary of a partition into which the data is being repartitioned can be established such that it coincides with, to the extent that it shares a common data element with, the lower boundary of a first partition into which the data is currently partitioned. The three data entries of such a first partition can be counted towards the total of the number of data entries that would end up in the new partition. Such a total can be compared with the target size of six data entries, and a determination can be made that additional data entries can be included in the new partition. A second partition, from among the partitions into which the data is currently partitioned, can be considered and its three data entries can be also counted towards the total of the number of data entries that would end up in the new partition. Such a total can now be commensurate with the target size for the new partition. Consequently, the upper boundary of the new partition can be selected to align with the upper boundary of the second partition into which data is currently partitioned such that the three entries of the first partition in the three entries of the second partition would all be part of a single new partition into which the data is being repartitioned. The lower boundary of the next new partition into which the data is being repartitioned can then be selected to align with the upper boundary of the prior partition that was determined in the above described manner.

In another embodiment, certain types data entries can provide greater information about the distribution of data entries within existing partitions. For example, data entries from a structured stream can provide detailed information regarding the distribution of such data entries within existing partitions, thereby enabling and interpolation across the range of data entries within an existing partition, assuming a uniform data distribution. In such embodiments, the partitions into which data is being repartitioned can be more accurately sized, based on upper and lower boundaries of such a range-based partitions, to provide for a greater evenness of the distribution of data entries across such partitions.

In yet another embodiment, partition boundaries can be chosen not only at compile time, but also at runtime. More specifically, if unbalanced partition boundaries are detected, such as, by the partial repartitioning optimizer 170, the data to be partitioned can be intercepted and a global histogram can be determined, reflecting the distribution of data entries as they would be in the partitions into which data is being repartitioned. Partition boundaries can, thereby, be more accurately established to result in a more even distribution of data entries among the partitions into which data is being repartitioned.

As will be recognized by those skilled in the art, once the partition boundaries are calculated it can be straightforward to determine which partition, currently assigned to a computing device, will provide the data entries for a subsequent partition into which the data is being repartitioned and, in such a manner, can be determined which source computing device communicates data which destination computing device. Mathematically, if an "ith" partition, of the partitions into which data is being repartitioned, is defined by a lower boundary of "$Out_{low}^i$" and an upper boundary of "$Out_{hi}^i$", then such an "ith" partition will receive data entries from an existing "jth" partition having a lower boundary of "$In_{low}^i$" and an upper boundary of "$In_{hi}^i$" if $\Pi_{CP}[Out_{low}^i, Out_{hi}^i] \cap \Pi_{CP}[In_{low}^j, In_{hi}^j]$, where CP is the longest common prefix between the data elements that are used to define the boundaries of the partitions into which the data is being repartitioned and the data elements that were used to define the boundaries of the partitions into which the data is already partitioned.

As will be described in further detail below, an optimizer, such as the partial repartitioning optimizer 170 of the system 100 of FIG. 1, can consider, if the partitions into which data is currently partitioned are range-based, whether a subsequent repartitioning of the data can also be range-based such that the ranges align to realize the efficiencies described in detail above. Once a repartitioning strategy is selected, such as by the partial repartitioning optimizer 170 shown in FIG. 1, the individual data processing computing devices can carry out such a repartitioning strategy. As indicated previously, repartitioning typically involves each individual data processing computing device dividing the data elements of the partition that is currently assigned to it into groupings which will then be communicated two other computing devices in accordance with the repartitioning strategy.

A traditional partitioning, as would be performed on an individual computing device, is illustrated by the exemplary system 310. As can be seen from the system 310, a data processing computing device 311 can comprise a storage medium 331 that can have encoded thereon data entries corresponding to a partition of a data set that is currently assigned to the processing computing device 311. In order to facilitate a repartitioning, the data entries of the partition currently assigned to the processing computing device 311 can be divided into groupings of data entries, where each grouping will then be communicated to another processing computing device, thereby facilitating the repartitioning. Typically, the manner in which such a division of the data entries into groupings is performed is by reading the data entries into memory 320, such as is illustrated by the action 338 and then proceeding through the data entries, storing each data entry into a separate file representing and individual grouping which will then be communicated to another data processing computing device.

Thus, for example, if a partition assigned to the processing computing device 311 comprised data entries 321, 322, 323, 324, 325, 326, 327, 328 and 329, those data entries can have been stored on the storage medium 331 of such a computing device 311. As part of the repartitioning the can be read into the memory 320 of the processing computing device 311, as illustrated by the action 338. Subsequently, data entry 321 can be considered and can be saved into a file representing the grouping of data entries conforming to a repartitioning strategy, which will be sent to another processing computing device. Data entry 322 can be processed in a similar manner, and so on. For ease of illustration, only some of the data entries are shown in the system 310 as being stored into separate files on a storage medium 332 of the processing computing device 311. The storage medium 332 can be the same physical storage medium as the storage medium 331, but is provided a different reference identifier to illustrate that, at the least, the storage medium 332 comprises a different orientation of data. Returning to the above example, the data entry 323 can be stored in a file that occupies a portion 342 of the storage medium 332. Similarly, data entries 325 and 327 can be stored in a file that occupies a portion 341 of the storage medium 332. Data entry 328 can, likewise, be stored in a file that occupies a portion 343 of the storage medium 332. In such a manner the action 339 of dividing the data entries into separate files can be performed.

Subsequently, the data from the separate files can be provided to the appropriate processing computing devices to facilitate the repartitioning. For example, data entries from the file that occupies a portion 346 of the storage medium 332 can be communicated, by the processing computing device 311, another processing computing device 312. Similarly, data entries from a file that occupies a portion 347 of the storage medium 332 can be communicated to a processing computing device 313, data entries from a file that occupies a portion 348 of the storage medium 332 can be communicated to a processing computing device 314, and data entries from a file that occupies a portion 349 of the storage medium 332 can be communicated or processing computing device 315.

Figure 3:
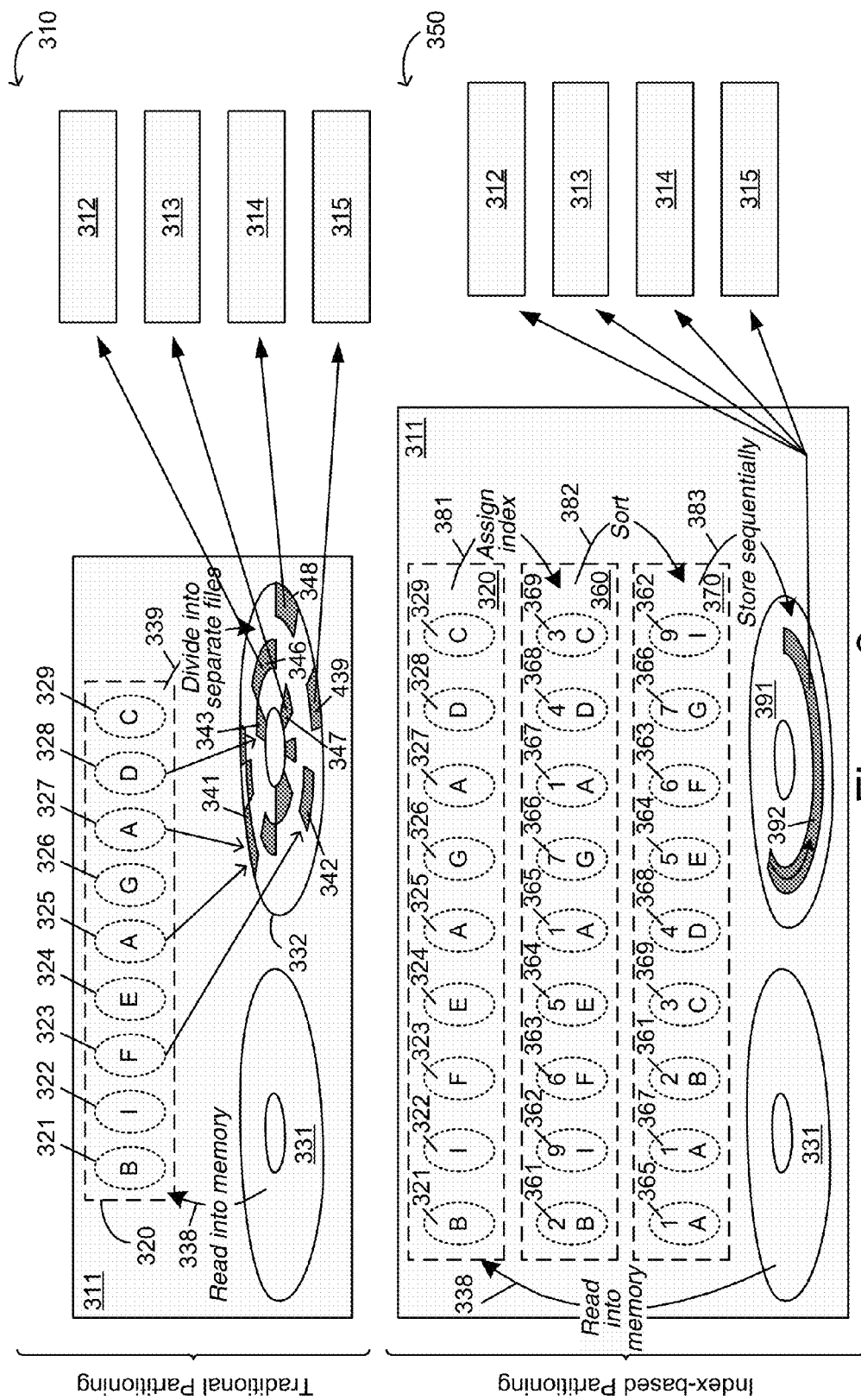
FIG. 3 is a block diagram illustrating an exemplary indexing of data to be repartitioned.

As will be recognized by those skilled in the art, and is graphically illustrated in FIG. 3 by the system 310, the individual files inch which the data entries are stored can occupy disparate portions of the storage medium 332 such that, for example, to store the data entry 327 into the file that occupies the portion 341 of the storage medium 332, the storage device comprising the storage medium 332 can position a read/write apparatus at the portion 341, but then to store the subsequent data entry 328 into the file that occupies the portion 343 of the storage medium 232, the storage device comprising storage media 332 can transition the read/write apparatus from the portion 341 to the portion 343. Such input/output operations are typically referred to as random input/output operations and, as will be recognized by those skilled in the art, such random input/output operations can be inefficient for certain types of storage media such as magnetic storage media.

Thus, in one embodiment, data entries can first be sorted prior to being stored back onto a processing computing device's storage medium for repartitioning purposes. In particular, and as exemplarily illustrated by the system 350 of FIG. 3, the same data entries 321, 322, 323, 324, 325, 326, 327, 328 and 329 can be read into memory 320, as illustrated by the action 338 of the system 350. For ease of reference, the same elements, or the same actions, as between the systems 310 and 350 retain the same numerical identifiers. After being read into memory 320, however, each of the data entries 321, 322, 323, 324, 325, 326, 327, 328 and 329 can be assigned an index, as illustrated by the action 381, where the index represents the grouping in which such a data entry belongs for purposes of repartitioning the data set. For example, the data entry 321 can be changed into a data entry 361 having an index represented by the numerical value "2" to signify that the data entry 321 belongs to a grouping of data entries that can be represented by the numerical value "2". In a similar manner, the data entry 322 can be changed into a data entry 362 having an index represented by the numerical value "9" to signify that the data entry 322 belongs to a grouping of data entries that can be represented by the numerical value "9". Data entries 323, 324, 325, 326, 327, 328 and 329 can be assigned indices in a similar manner, changing those data entries into data entries 363, 364, 365, 366, 367, 368 and 369.

Subsequently, the data entries 361, 362, 363, 364, 365, 366, 367, 368 and 369 having the indices assigned to them can be sorted, as illustrated by the action 382, in accordance with those indices. For purposes of illustration memory 360 is provided a different numerical identifier than memory 320, not to indicate that it is a separate memory, but rather to indicate that it is a memory holding a different set of data. Similarly, memory 370 is provided a different numerical identifier than memory 360. As can be seen from the memory 370, the data entries 361, 362, 363, 364, 365, 366, 367, 368 and 369 can be sorted in accordance with their assigned numerical identifiers such that, in the exemplary system 350 of FIG. 3, when viewed from left to right, the data entries are in the order of: data entry 365, data entry 367, data entry 361 and so on. The sorted data entries, as represented by the memory 370, can then be stored on the storage medium 391 in a sequential manner, as illustrated by the action 383. As before, the storage medium 391 is a signed a different numerical identifier than the storage medium 331 to indicate that, at the least, it is a storage medium comprising a different organization of data than the storage medium 331.

Is graphically illustrated by the portion 392, and is will be recognized by those skilled in the art, such as sequential storing 383 of the sorted data entries can be performed more efficiently than the random input/output operations described above in connection with the system 310. Subsequently, the data entries can be read from the portion 392 in a sequential manner and those data entries having a first index can be communicated to the processing computing device 312, those having a second index can be communicated to the processing computing device 313, those having a third index can be communicated to the processing computing device 314, those having a fourth index can be communicated to the processing computing device 315, and so on. In such a manner, the repartitioning operations performed on individual data processing computing devices can be performed more efficiently.

Flow diagram 400 shown therein illustrates an exemplary series of steps that can be performed by a repartitioning optimizer, such as, for example, the partial repartitioning optimizer 170 that was shown in FIG. 1. As illustrated by step 410, initially a job or query can be received for which a repartitioning of data is appropriate. Subsequently, at step 420, a determination can be made as to whether a current partitioning, from which the data will be repartitioned, is hash-based or range-based. If the determination, at step 420, determines that the current partitioning is hash-based, processing can proceed to step 430. At step 430 is determination can be made as to whether any repartitioning strategies can provide for empty groupings of data at individual ones of the processing computing devices that currently comprise partitions of data sets such that at least some of those computing devices will not need to communicate with at least some other computing devices across which the data is being repartitioned. The determination at step 430 can be performed in accordance with the mathematical considerations described in detail above.

If it is determined, at step 430, that a repartitioning that can provide for such empty groupings is possible, then processing can proceed to step 440 at which point repartitioning strategies allowing for either a partial merge or a partial partitioning, such as those described in detail above, can be found that are relevant for the job were query that was received at step 410. Alternatively, if it is determined, at step 430, that a repartitioning providing for empty groupings is not possible, then processing can skip to step 460.

If, at step 420, it was determined that a current partitioning was range-based, then processing can proceed to step 450 at which point repartitioning strategies can be determined that result in empty groupings, and that result in approximately evenly distributed partitions of data, and which are relevant for the job were query that was received at step 410. The determination of repartitioning strategies at step 450 can be performed in accordance with the determinations described in detail above. Subsequently, at step 460, and optimum repartitioning strategy can be selected based upon the processing, input/output, and network transfer costs. The size of the resulting partitions can also be taken into account since, as indicated previously, a partition having a lot of data entries can result in the computing device assigned such a partition taking a longer amount of time to perform the relevant processing, thereby slowing down the determination of the ultimate response to the received job or query. At step 470, then, the relevant processing can end with the optimal repartitioning strategy for the job or query that was received at step 410.

Figure 4:
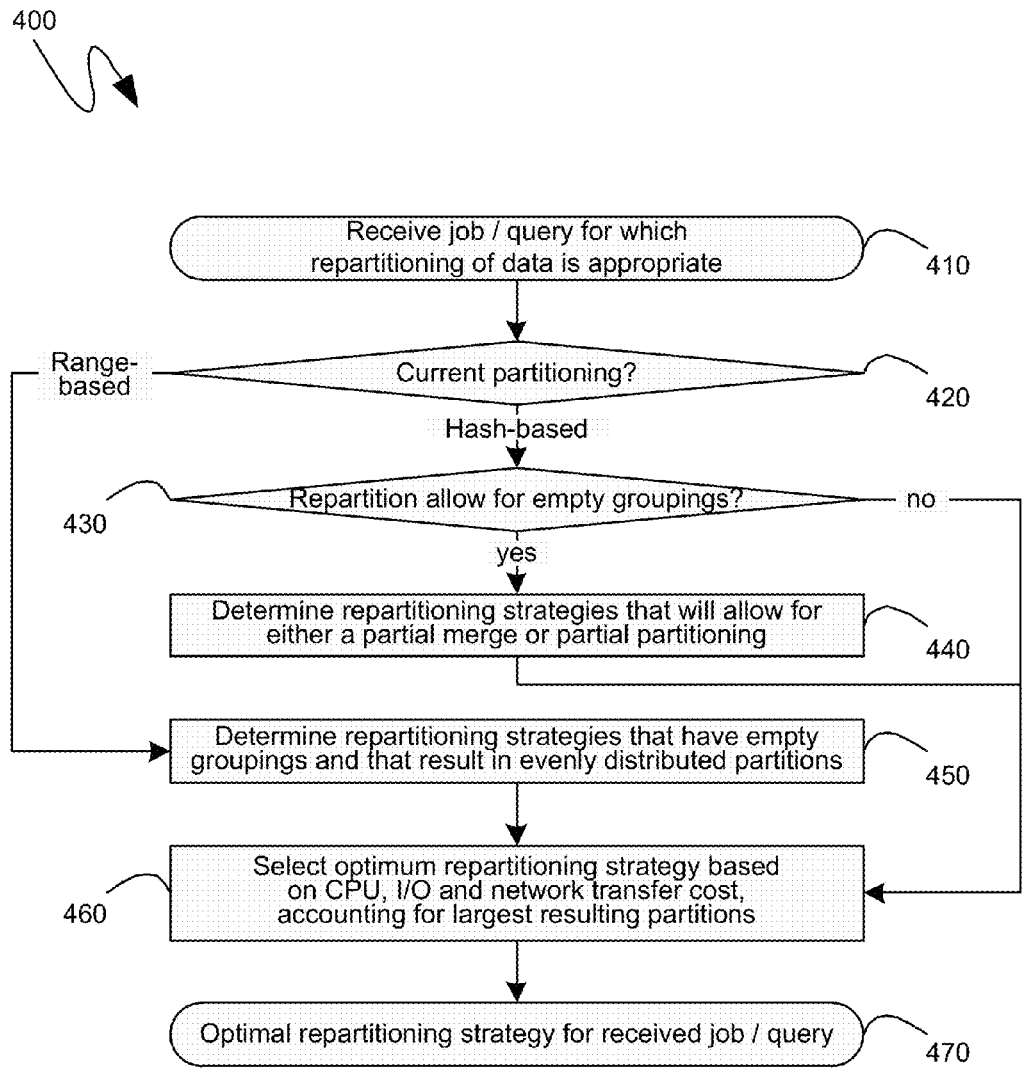
FIG. 4 is a flow diagram of an exemplary operation of a repartitioning optimizer.
Figure 5:
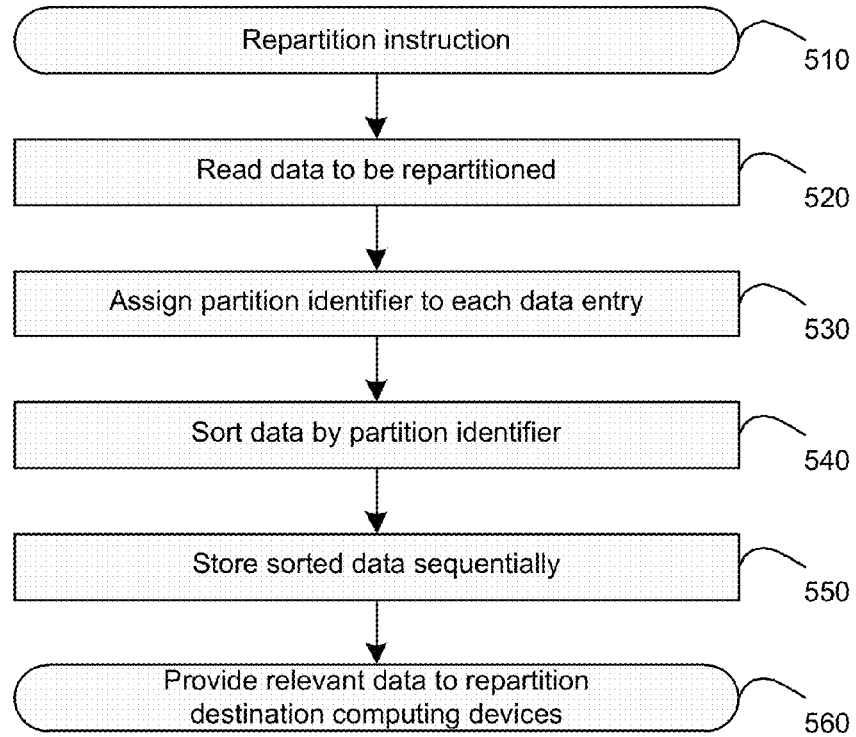
FIG. 5 is a flow diagram of an exemplary repartitioning.

Turning to FIG. 5, the flow diagram 500 shown therein illustrates an exemplary series of steps that can be performed by individual data processing computing devices to enable them to perform actions relevant to repartitioning in a more efficient manner. As will be recognized by those skilled in the art, the steps of the flow diagram 500 can be performed to provide more efficient repartitioning irrespective of the specific type of repartitioning strategy that was selected, such as, for example, by the performance of the steps of the flow diagram 400 of FIG. 4. Initially, as illustrated by the step 510 in FIG. 5, a processing computing device can receive and instruction to divide the data entries of the partition currently assigned to it into groupings for purposes of a repartitioning of the data set. Subsequently, at step 520, the individual data entries of the partition that was assigned to the computing device can be read into memory and, at step 530, a partition identifier can be assigned to each data entry. As indicated previously, the partition identifier can identify the grouping into which such a data entry is to be placed for purposes of the repartitioning.

Subsequently, at step 540, the data entries can be sorted by the partition identifier that was assigned to them, such as, for example, by being stable stored, so that the original data order for entries with the same partition identifier is maintained. Once sorted, they can be stored sequentially, as illustrated by the step 550. As needed, then, at step 560, the relevant data entries can be read, sequentially, and provided to the relevant destination computing devices. Processing can then end with step 560.

Figure 6:
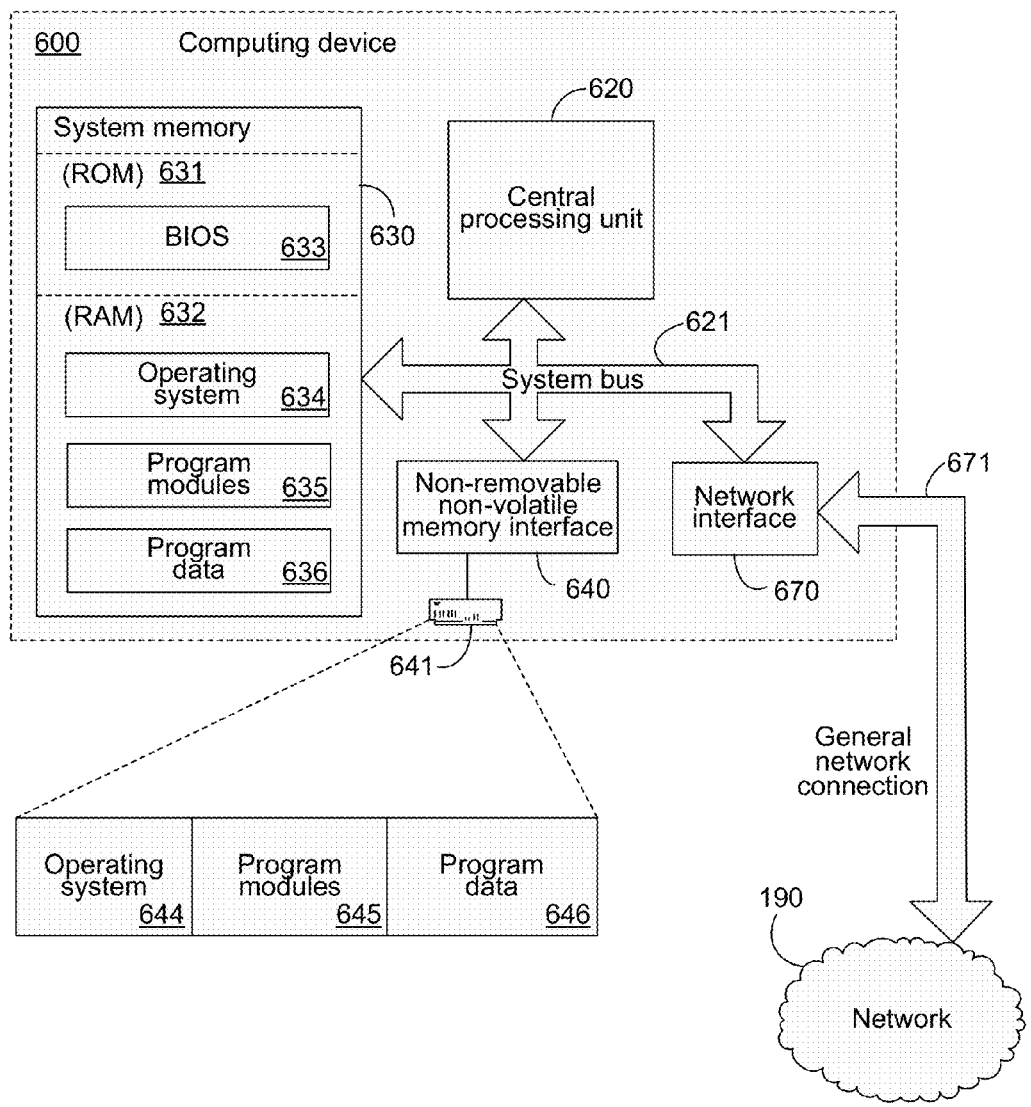
FIG. 6 is a block diagram of an exemplary computing device.

Turning to FIG. 6, an exemplary 600 is illustrated, comprising, in part, hardware elements that can be utilized in performing and implementing the above described mechanisms. The exemplary computing device 600 can include, but is not limited to, one or more central processing units (CPUs) 620, a system memory 630 and a system bus 621 that couples various system components including the system memory to the processing unit 620. The system bus 621 may be any of several types of bus structures including a memory bus or memory controller, a peripheral bus, and a local bus using any of a variety of bus architectures. Depending on the specific physical implementation, one or more of the CPUs 620, the system memory 630 and other components of the computing device 600 can be physically co-located, such as on a single chip. In such a case, some or all of the system bus 621 can be nothing more than silicon pathways within a single chip structure and its illustration in FIG. 6 can be nothing more than notational convenience for the purpose of illustration.

The computing device 600 also typically includes computer readable media, which can include any available media that can be accessed by computing device 600. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 600. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the computing device 600 may operate in a networked environment via logical connections to one or more remote computers. The logical connection depicted in FIG. 6 is a general network connection 671 to the network 190 described previously. The network 190 to which the exemplary computing device 600 is communicationally coupled can be a local area network (LAN), a wide area network (WAN) such as the Internet, or other networks. The computing device 600 is connected to the general network connection 671 through a network interface or adapter 670, which is, in turn, connected to the system bus 621. In a networked environment, program modules depicted relative to the computing device 600, or portions or peripherals thereof, may be stored in the memory of one or more other computing devices that are communicatively coupled to the computing device 600 through the general network connection 671. It will be appreciated that the network connections shown are exemplary and other means of establishing a communications link between computing devices may be used.

Among computer storage media, the system memory 630 comprises computer storage media in the form of volatile and/or nonvolatile memory, including Read Only Memory (ROM) 631 and Random Access Memory (RAM) 632. A Basic Input/Output System 633 (BIOS), containing, among other things, code for booting the computing device 600, is typically stored in ROM 631. RAM 632 typically contains data and/or program modules that are immediately accessible to and/or presently being operated on by processing unit 620. By way of example, and not limitation, FIG. 6 illustrates operating system 634, other program modules 635, and program data 636.

The computing device 600 may also include other removable/non-removable, volatile/nonvolatile computer storage media. By way of example only, FIG. 6 illustrates a hard disk drive 641 that reads from or writes to non-removable, non-volatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640.

The drives and their associated computer storage media discussed above and illustrated in FIG. 6, provide storage of computer readable instructions, data structures, program modules and other data for the computing device 600. In FIG. 6, for example, hard disk drive 641 is illustrated as storing operating system 644, other program modules 645, and program data 646. These components can either be the same as or different from operating system 634, other program modules 635 and program data 636. Operating system 644, other program modules 645 and program data 646 are given different numbers here to illustrate that, at a minimum, they are different copies.

As can be seen from the above descriptions, more efficient repartitioning mechanisms have been presented. In view of the many possible variations of the subject matter described herein, we claim as our invention all such embodiments as may come within the scope of the following claims and equivalents thereto.

We claim:

1. A method for repartitioning a data set among multiple computing devices, the method comprising the steps of:
receiving, at a computing device, a query directed to the data set, which is currently partitioned into a first quantity of partitions distributed among a first set of computing devices;
selecting, if the current partitioning was based upon hash values of individual data entries of the data set, a repartitioning strategy at the computing device to repartition the data set among a second set of computing devices, the selected repartitioning strategy comprising:
hashing values of individual data entries of the data set with a same hash function as was utilized to effectuate the current partitioning; and
selecting a second quantity of partitions into which the data set is to be repartitioned to have a common positive factor greater than one with the first quantity of partitions, thereby expressly providing that at least some computing devices of the first set of computing devices do not provide data to at least some computing devices of the second set of computing devices;
selecting, if the current partitioning was based upon ranges of values of a first collection of one or more data elements of the data entries of the data set, the repartitioning strategy at the computing device to repartition the data set among the second set of computing devices, the selected repartitioning strategy comprising:
selecting a second collection of one or more data elements of the data entries of the data set to include at least one data element from the first collection; and
selecting ranges of values of the second collection of one or more data elements of the data entries of the data set such that repartitioning the data set in accordance with the selected ranges of values results in at least some computing devices of the first set of computing devices not providing data to at least some computing devices of the second set of computing devices; and
instructing, by the computing device, the computing devices of the first set of computing devices to repartition the data set in accordance with the selected repartitioning strategy.

2. The method of claim 1, wherein the at least some of the computing devices in the second set of computing devices were also in the first set of computing devices such that repartitioning the data set in accordance with the selected repartitioning strategy causes those computing devices that are in both the first set of computing devices and the second set of computing devices to retain, as part of the repartitioning, at least a portion of the data set was distributed to them prior to the receiving the query.

3. The method of claim 1, wherein the selecting the ranges of values of the second collection of data elements comprises:
establishing a lower bound, for a range of values of the second collection of data elements, the established lower bound being based on at least one data element that is shared by both the first collection of data elements and the second collection of data elements;
identifying a partition assigned to one of the first set of computing devices whose lower bound coincides with the established first lower bound;
identifying one or more subsequent partitions assigned to others of the first set of computing devices whose lower bounds coincide with upper bounds of previously identified partitions if a total quantity of data entries in the identified partitions is less than a predetermined threshold quantity of data entries for partitions into which the data set is being repartitioned; and
establishing an upper bound, for the range of values of the second collection of data elements, based on an upper bound of a last identified partition assigned to one of the first set of computing devices.

4. The method of claim 1, wherein the selected repartitioning strategy further minimizes a quantity of data entries in a largest partition after performance of the repartitioning strategy.

5. A method for repartitioning a data set among multiple computing devices, the method comprising the steps of:
assigning, at a computing device, a partition index to individual data entries of a current partition that is currently assigned to the computing device, the partition index identifying a new partition which will, after the repartitioning, comprise the individual data entries that are assigned the partition index;
sorting, at the computing device, the data entries by the assigned partition index;
storing the sorted data entries sequentially on a storage medium of the computing device that is currently assigned the current partition comprising the individual data entries;
providing, from the computing device, the data entries to a computing device that is assigned one of the new partitions, into which the data set is being repartitioned, by sequentially reading, from the storage medium, those data entries whose assigned partition index identifies the one of the new partitions that is assigned to the computing device to which the data entries are being provided; and
receiving a repartition instruction;
wherein, the assigning the partition index to the individual data entries comprises hashing identified data elements, identified by the received repartition instruction, of each of the individual data entries to which the partition index will be assigned; and assigning the partition index based on hash values of the individual data entries resulting from the hashing if the received repartition instruction identifies a hash-based repartitioning strategy; and
wherein the assigning the partition index to the individual data entries comprises determining a particular range, from among the ranges identified by the received repartition instruction, comprising each of the individual data entries to which the partition index will be assigned; and assigning the partition index based on the determined range if the received repartition instruction identifies a range-based repartitioning strategy.

6. The method of claim 5, wherein the storing the sorted data entries sequentially comprises storing the sorted data entries into a single file.

7. A system for repartitioning of a data set among multiple computing devices, the system comprising:
the data set, currently partitioned among a first set of computing devices, wherein the data set will be repartitioned among a second set of computing devices;
multiple computing devices for independently processing data in parallel with one another, wherein each of the multiple computing devices comprises one or more processing units, the multiple computing devices comprising the first set of computing devices and the second set of computing devices, and wherein further each computing device in the first set of computing devices comprises a computer-readable medium having computer-executable instructions directed to steps comprising:
assigning a partition index to individual data entries of the current partition that is assigned to the computing device comprising the computer-readable medium, the partition index identifying a new partition which will, after the repartitioning, comprise the individual data entries that are assigned the partition index;
sorting the data entries by the assigned partition index;
storing the sorted data entries sequentially on a storage medium of the computing device that is currently assigned the current partition comprising the individual data entries; and
providing the data entries to a computing device of the second set of computing devices by sequentially reading, from the storage medium, those data entries whose assigned partition index identifies the one of the new partitions that is assigned to the computing device to which the data entries are being provided; and
at least one management computing device comprising a computer-readable medium having computer-executable instructions directed to steps comprising:
receiving a query directed to the data set;
selecting, if the current partitioning was based upon hash values of individual data entries of the data set, a repartitioning strategy to repartition the data set among the second set of computing devices, the selected repartitioning strategy comprising:
hashing values of individual data entries of the data set with a same hash function as was utilized to effectuate the current partitioning; and
selecting a second quantity of partitions into which the data set is to be repartitioned to have a common positive factor greater than one with the first quantity of partitions, thereby expressly providing that at least some computing devices of the first set of computing devices do not provide data to at least some computing devices of the second set of computing devices;
selecting, if the current partitioning was based upon ranges of values of a first collection of one or more data elements of the data entries of the data set, the repartitioning strategy to repartition the data set among the second set of computing devices, the selected repartitioning strategy comprising:
selecting a second collection of one or more data elements of the data entries of the data set to include at least one data element from the first collection; and
selecting ranges of values of the second collection of one or more data elements of the data entries of the data set such that repartitioning the data set in accordance with the selected ranges of values results in at least some computing devices of the first set of computing devices not providing data to at least some computing devices of the second set of computing devices; and
instructing the computing devices of the first set of computing devices to repartition the data set in accordance with the selected repartitioning strategy.

8. The system of claim 7, wherein at least some of the multiple computing devices are part of both the first set of computing devices and the second set of computing devices such that repartitioning the data set in accordance with the selected repartitioning strategy causes those computing devices that are in both the first set of computing devices and the second set of computing devices to retain, as part of the repartitioning, at least a portion of the data set was distributed to them prior to the receiving the query.

9. The system of claim 7, wherein at least one of the multiple computing devices is also the at least one management computing device.

10. The system of claim 7, wherein the computer-executable instructions for selecting the ranges of values of the second collection of data elements comprise computer-executable instructions for:
establishing a lower bound, for a range of values of the second collection of data elements, the established lower bound being based on at least one data element that is shared by both the first collection of data elements and the second collection of data elements;
identifying a partition assigned to one of the first set of computing devices whose lower bound coincides with the established first lower bound;
identifying one or more subsequent partitions assigned to others of the first set of computing devices whose lower bounds coincide with upper bounds of previously identified partitions if a total quantity of data entries in the identified partitions is less than a predetermined threshold quantity of data entries for partitions into which the data set is being repartitioned; and
establishing an upper bound, for the range of values of the second collection of data elements, based on an upper bound of a last identified partition assigned to one of the first set of computing devices.

11. The system of claim 7, wherein the selected repartitioning strategy further minimizes a quantity of data entries in a largest partition after performance of the repartitioning strategy.

12. The system of claim 7, wherein the computer-executable instructions for storing the sorted data entries sequentially comprise computer-executable instructions for storing the sorted data entries into a single file.

13. The method of claim 1, wherein the computing device performing the receiving, the selecting and the instructing is one of the multiple computing devices among which the data set is being repartitioned.

14. The method of claim 5, wherein the computing device performing the assigning, the sorting, and the providing is one of the multiple computing devices among which the data set is being repartitioned.

15. The method of claim 1, wherein the selecting the ranges of values of the second collection of data elements comprises: interpolating values across a range of data entries within an existing partition by assuming a uniform data distribution across the range of data entries within the existing partition.

16. The system of claim 7, wherein the selecting the ranges of values of the second collection of data elements comprises: interpolating values across a range of data entries within an existing partition by assuming a uniform data distribution across the range of data entries within the existing partition.

17. The method of claim 1, further comprising the steps of: generating a global histogram reflecting distribution of data entries in partitions if the selected repartitioning strategy is implemented.

18. The system of claim 7, wherein the computer-readable medium of the at least one management computing device further comprises computer-executable instructions directed to steps comprising: generating a global histogram reflecting distribution of data entries in partitions if the selected repartitioning strategy is implemented.

19. The method of claim 17, further comprising the steps of: repeating the selecting the ranges of values of the second collection of data elements, wherein the repeated selecting the ranges of values is performed with reference to the generated global histogram to generate a more even distribution of a quantity of data entries in partitions after performance of the repartitioning strategy.

20. The system of claim 19, wherein the computer-readable medium of the at least one management computing device further comprises computer-executable instructions directed to steps comprising: repeating the selecting the ranges of values of the second collection of data elements, wherein the repeated selecting the ranges of values is performed with reference to the generated global histogram to generate a more even distribution of a quantity of data entries in partitions after performance of the repartitioning strategy.

* * * * *